United States Patent [19]

Eastep

[11] Patent Number: 5,566,328
[45] Date of Patent: Oct. 15, 1996

[54] RECONSTRUCTING DIRECTORY PATHNAMES FROM FILE HANDLES IN A COMPUTER SYSTEM

[75] Inventor: Thomas M. Eastep, Lynnwood, Wash.

[73] Assignee: Tandem Computers Incorporated, Cupertino, Calif.

[21] Appl. No.: 379,312

[22] Filed: Jan. 23, 1995

[51] Int. Cl.$^6$ .................................................. G06F 17/30
[52] U.S. Cl. ..................................... 395/600; 364/DIG. 1; 364/282.1; 364/282.3
[58] Field of Search ...................................... 395/600, 700

[56] References Cited

U.S. PATENT DOCUMENTS

| | | | |
|---|---|---|---|
| 4,479,196 | 10/1984 | Ferrer et al. | 395/600 |
| 4,987,531 | 1/1991 | Nishikado et al. | 395/600 |
| 5,218,696 | 6/1993 | Baird et al. | 395/600 |
| 5,301,286 | 4/1994 | Rajani | 395/412 |
| 5,313,646 | 5/1994 | Hendricks et al. | 395/600 |
| 5,333,317 | 7/1994 | Dann | 395/600 |
| 5,388,257 | 2/1995 | Bauer | 395/600 |
| 5,412,808 | 5/1995 | Bauer | 395/600 |
| 5,434,974 | 7/1995 | Loucks et al. | 395/700 |
| 5,437,029 | 7/1995 | Shinha | 395/600 |
| 5,465,365 | 11/1995 | Winterbottom | 395/600 |

OTHER PUBLICATIONS

Hal Stern, "Managing NFS and NIS," 1991 O'Reilly & Associates, Inc., pp. 89–137.
A. K. Yeo et al., "A Taxonomy of Issues in Name Systems Design and Implementation," Operating Systems Review, vol. 27 No. 3, July 1993, pp. 4–18.

*Primary Examiner*—Paul V. Kulik
*Attorney, Agent, or Firm*—Charles J. Kulas; Philip H. Albert; Townsend and Townsend and Crew LLP

[57] ABSTRACT

Link Ids are associated with file handles in a directory structure in a computer operating system. The Link Ids allow a file handle to be mapped uniquely to a pathname for a file associated with the file handle. In one implementation lists are used to facilitate fast searching of directory structures for a name associated with a Link Id. The list includes entry pairs where each entry pair is a Link Id and a directory number where a name associated with the Link Id may be found.

2 Claims, 4 Drawing Sheets

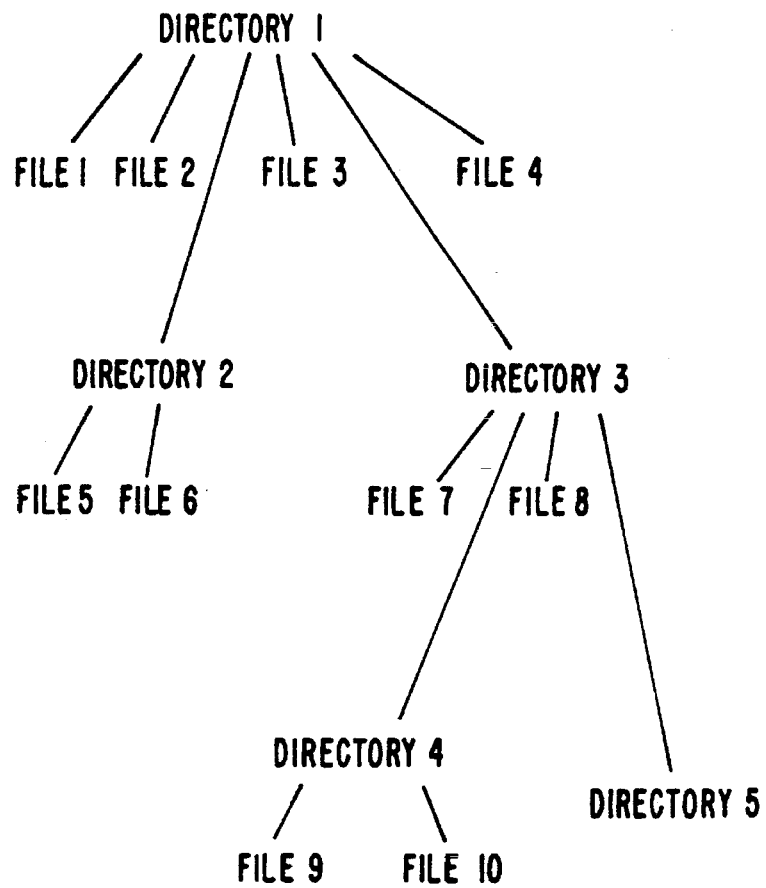
FIG. IA. PRIOR ART
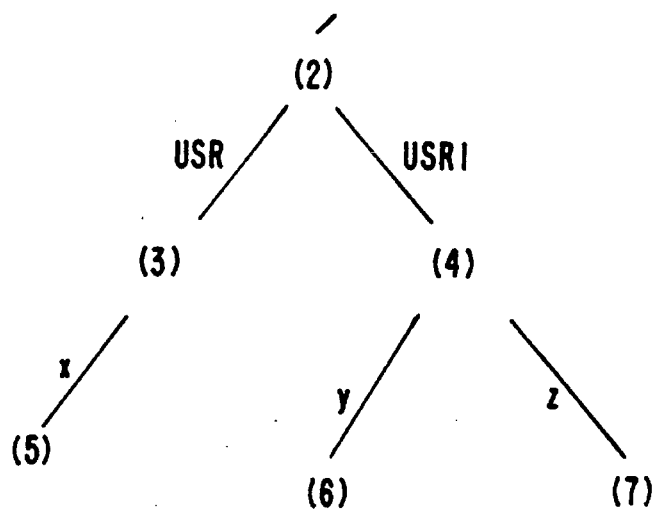
FIG. IB. PRIOR ART

RECONSTRUCTING DIRECTORY PATHNAMES FROM FILE HANDLES IN A COMPUTER SYSTEM

BACKGROUND OF THE INVENTION

This invention relates generally to identifying files in computer operating systems and specifically to reconstructing a pathname from a file handle maintained by an operating system.

Traditional computer operating systems use various ways to organize and manage files stored within a computer. One popular way to organize files is with a directory structure that allows files or directories to reside within other directories. When a directory resides within another directory, the residing directory is referred to as a "sub-directory." A file ultimately resides in a "parent" directory. The file's parent directory may, in turn, have a parent directory, and so on, thus creating a hierarchy of directories. This hierarchy of directories, each of which may contain files and additional directories, results in a directory tree structure such as the one shown in FIG. 1A. In order to access a particular file, each of the parent directories in a chain from a starting, or "root," directory are named in a string, along with the file's name. The resulting string is called a "pathname."

FIG. 1A shows a prior art directory structure including root directory, "directory1," which contains files such as "file1," "file2," "file3" and "file4." Directory1 also includes directories directory2 and directory3. Directory2, in turn, contains files file5 and file6. Directory3 contains files file7 and file8 and also contains directories directory4 and directory5. Directory4 contains files file9 and file10. In practice a directory can contain any number of files or directories.

The operating system allows a user of the computer system to create, access and manipulate files and directories within a directory structure such as the directory structure shown in FIG. 1A. For example, a user can create a file and specify that the file be placed in a particular directory. The user can also delete or move files. Similarly, for directories, the user can specify that a directory be created or deleted. Some operating systems, such as operating systems based on the UNIX® operating system (i.e., UNIX®-like operating systems), allow a user to create "links" between files so that a file can be accessed by more than one name.

In FIG. 1A, file7 is referenced by the text string "/directory1/directory3/file7". The directory, directory1, is referred to as the "root" directory and is always given as the starting directory in a pathname where the pathname specifies an absolute path to a file. An absolute pathname uniquely identifies any file within a given file system without requiring further information. Another form of pathname is a relative pathname, which identifies a file by using the relative path and a reference point such as a "current" directory or starting point.

For example, in a relative path, assuming the current directory is directory3, file7 may be referenced merely by giving the name of the file as "file7". Another example of a relative path, assuming the current directory is directory1, is to use the path "directory3/file7" to access file7. For ease of discussion, this application describes the invention in terms of absolute pathnames. It will be apparent that the concepts presented herein are equally applicable to relative pathnames. For general information on the UNIX® directory structure and pathnames consult, e.g., ISO/IEC 9945-1, IEEE 1003.1-1990.

While pathnames are convenient ways for human users to specify directories and files, the operating system uses a more computationally convenient internal representation of a pathname called a "file handle". Typically, a file handle is a unique number or group of numbers and may also include other information that uniquely identifies an item such as a directory or file residing within the computer system.

In UNIX®-like operating systems file handles include numbers called "inode" numbers. A unique inode number is assigned to each file and directory within a directory structure or "file system". The file or directory may be equivalently referenced by its name or file handle. For purposes of discussing the present invention, the inode number is considered to be equivalent to the file handle for a given file in a file system in a UNIX® operating system.

FIG. 1B is an example of a directory tree structure in a UNIX®-like operating system. Rather than use the descriptive names of, e.g., "directory1," "file1," etc., more typical names are used such as would be encountered in a UNIX®-like system. For example, the root directory is given the label "/" while the two directories shown in FIG. 1B are labelled "usr" and "usr1". Note also, in FIG. 1B, that the names for directories and files (e.g., files "x," "y," and "z") are placed adjacent to the edges of the graph of the directory structure. Instead of file and directory names at the nodes of the directory graph as in FIG. 1A, the inode numbers shown in FIG. 1B are placed at the nodes. This illustrates the operating system's point of view that files and directories are represented by file handles (i.e., inode numbers). The inode numbers are shown as numeric values in parentheses. The inode numbers are associated with data structures that hold "meta data" for each file or directory. The meta-data includes information about the associated file or directory such as size, creation date, access rights, etc.

In order to translate, or "resolve" a pathname to an inode number (i.e., a file-handle) the names adjacent to edges in the graph are combined proceeding from the root directory to the file desired. For example, file "y" is shown with an inode number of 6 (or simply, "inode 6"). The pathname for inode 6 is "/usr1/y". In FIG. 1B, the root directory has inode number 2, directory usr has inode number 3, etc. Note that, within pathnames, the individual file and directory names are separated using the slash ("/") character. For example, the pathname to inode number 7 is "/usr1/z".

Each file resides on a file system where a file system represents one or more disk drives. The file system containing the root directory is called the root file system. Each file system has its own file hierarchy headed by a root directory. The inode number for a root directory is always, by convention, the number 2. Inode numbers are unique within a file system. File systems are grafted onto the root file system by a process called mounting. For example, if file 5 ("/usr/x") is a directory then a second file system could be mounted on that directory as shown in FIG. 1C.

In FIG. 1C, File System 2 has been mounted on File System 1 at the directory with inode number 5 ("directory5") of FIG. 1A. Note that, after the mount, the root directory of File System2 has effectively replaced File System 1's directory5 in the file hierarchy. Directory5 will not be visible until File System 2 is unmounted. Once the mount has taken place, access to files in File System 2 is made with pathnames beginning with "/usr/x". For example, to access file 6 in File System 2, the pathname "/usr/x/q/s" would be used.

The process of locating a file using a pathname is called pathname resolution. The product of pathname resolution is a file handle. A file handle is used by the operating system internally to refer to a file without having to resolve the file's name again. The file handle returned is typically a combination of the file system number (usually called a device number) and the inode number. Herein, file handles, are represented using a pair of integers enclosed by parentheses (e.g., (2,6)).

Renaming files across file systems is not allowed (for example, in FIG. 1D it would be illegal to rename "/usr1/y" to "/usr/x/p/f").

A useful feature of UNIX® systems is that files can have more than one name, although most implementations allow directories to have only a single name. The link() system call is used to add a new name for an existing file. For example, if the call link("/usr/x/q/r", "/usr/x/p/f") were made in an operating system including the directory structure of FIG. 1C, the result would be as in FIG. 1D. Now either of the pathnames "/usr/x/q/r" or "/usr/x/p/f" can be used to access file (2,5). Note that this is not a situation where one name is the primary name and the other is an alias—both names can be used equally and the original name can be removed without affecting the new name.

As is the case with rename, the link() system call generally does not allow links between file systems.

A problem exists with the file organization in that, given a file handle, there may be more than one pathname that resolves to the file represented by the file handle. This makes it difficult to regenerate a pathname based on a file handle. For example, given file (2,5), because of the link call discussed above, there would be two possible pathnames to the file. With only the limited information provided by the inode number, it is impossible to tell which pathname was originally used to create the file handle, i.e., the inode number.

Therefore, it is desirable to have a system where a file handle that is one of multiple file handles for the same file can be used to regenerate the pathname that was originally resolved to create the file handle. Such a system would be useful, for example, to generate a pathname that was used to open a file in the case where the file has several file handles and pathnames.

SUMMARY OF THE INVENTION

To uniquely map a pathname to a given file handle, the system of the present invention uses additional information associated with the file system inode numbers, or file handle. Specifically, the system uses a number called a "link Id" and the inode number of the parent directory. A Link Id is a number that uniquely identifies a link to a file.

In one embodiment of the invention, a method for resolving pathnames to file handles in an operating system is used. The method includes assigning a link Id number to a new file by performing the substeps of creating and storing a link to the new file from a pre-existing parent file; creating and storing a node number for the new file; storing a unique link Id number for the new file, where the link Id number is unique among all links to the file and, subsequent to the previous steps, resolving the pathname to the new file by using the node number and link Id of the new file.

BRIEF DESCRIPTION OF THE DRAWINGS

FIG. 1A shows an example of a directory structure;
FIG. 1B is an example of a directory tree structure in a UNIX®-like operating system;

DETAILED DESCRIPTION OF A PREFERRED EMBODIMENT

Figure 1C:
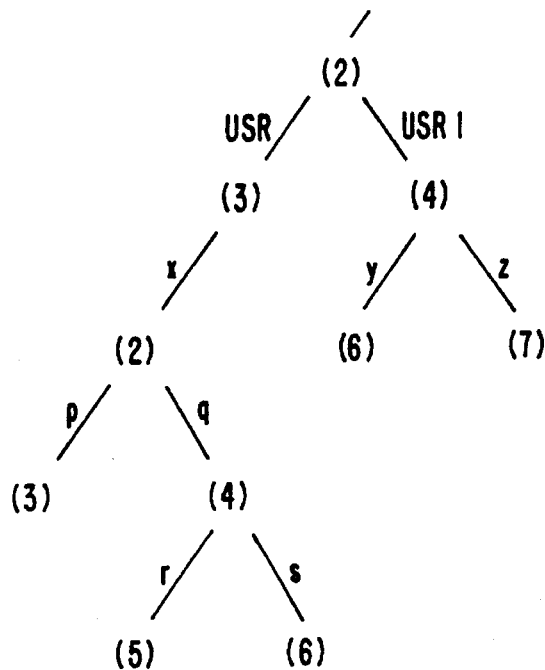
FIG. 1C shows one file system mounted on another.
Figure 1D:
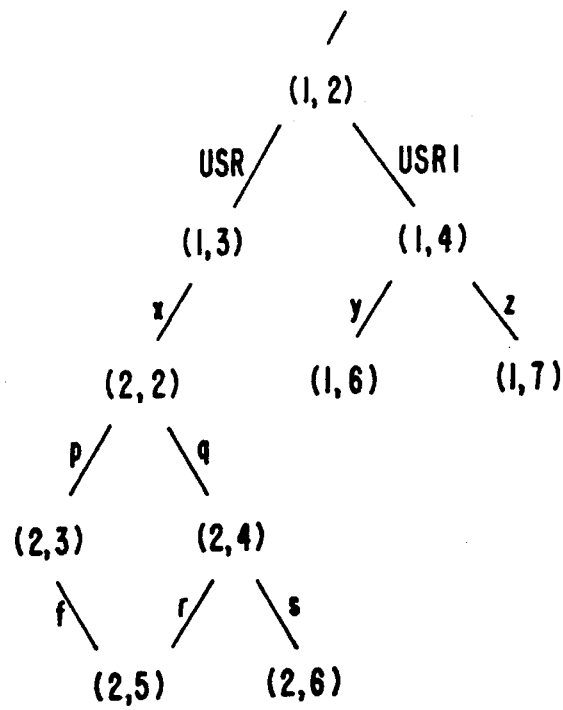
FIG. 1D shows the result of executing a link command to the directory structure of FIG. 1C.
Figure 2:
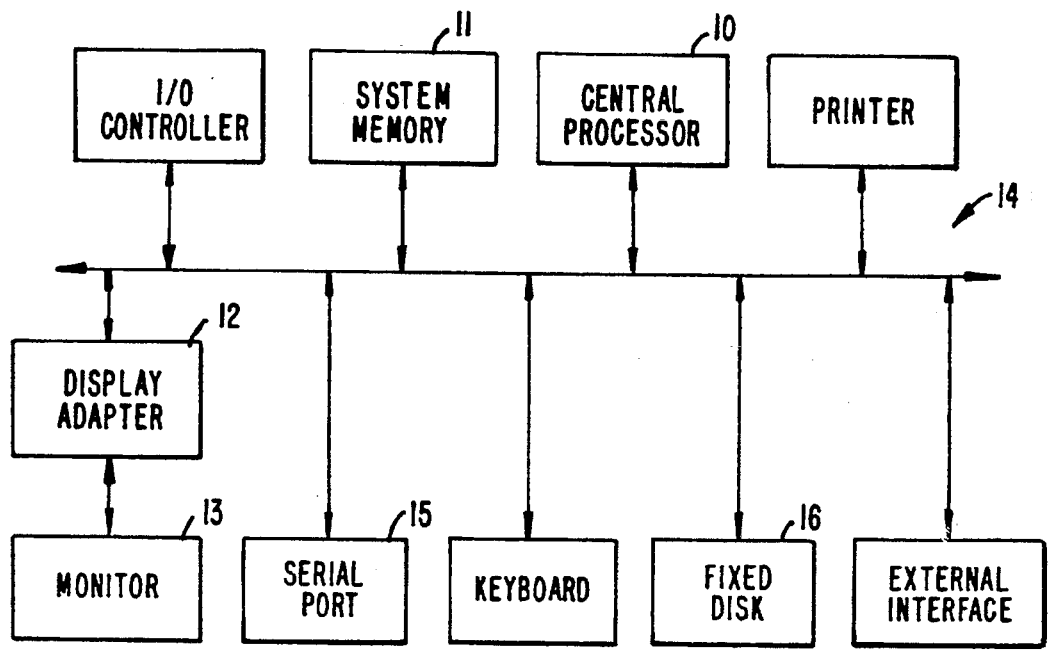
FIG. 2 is an illustration of basic subsystems in a typical computer system suitable for use with the present invention.

FIG. 2 is an illustration of basic subsystems in a typical computer system suitable for use with the present invention. In FIG. 2, subsystems are represented by blocks such as central processor 10, system memory 11, display adapter 12, monitor 13, etc. The subsystems are interconnected via a system bus 14. Additional subsystems such as a printer, keyboard, fixed disk and others are shown. Peripherals and input/output (I/O) devices can be connected to the computer system by, for example serial port 15. For example, serial port 15 can be used to connect the computer system to a modem or mouse input device. The interconnection via system bus 14 allows central processor 10 to communicate with each subsystem and to control the execution of instructions from system memory 11 or fixed disk 16, and the exchange of information between subsystems. Other arrangements of subsystems and interconnections are possible.

The present invention uses the concept of a "link Id." The link Id is essentially a count of the number of links to a file. A lastLinkId field is kept for each inode in the operating system's directory structure. The lastLinkId field contains the link Id number for each name that has been assigned, or "linked," to the inode.

When a file is initially created, the associated inode's lastLinkId field is set to 1 and the initial link to the file is also 1. As such successive link is added, lastLinkId is incremented and its value becomes the Id of the new link. Note that link Ids need only be unique within each inode—the first link assigned to any file always has link Id 1, the second has link Id 2, etc.

As an example, suppose that the root file system is empty and that file "/a" is created. The new file will have inode number 3 (because the root directory always gets inode number 2) and "a" will have link Id 1. The contents of the root directory are shown in Table I.

TABLE I

| Name | inode number | link Id |
|------|--------------|---------|
| a    | 3            | 1       |

Now, if the call link("/a", "/b") is made, the directory will be as shown in Table II.

TABLE II

| Name | inode number | link Id |
|------|--------------|---------|
| a    | 3            | 1       |
| b    | 3            | 2       |

Next, assume that directory "d" (inode number 4) is added to the root directory. The root directory's contents would then be as shown Table III.

TABLE III

| Name | inode number | link Id |
|------|--------------|---------|
| a    | 3            | 1       |
| b    | 3            | 2       |
| d    | 4            | 1       |

If at this point, the call link ("/a", "/d/f") is made, the contents of the root directory are unchanged and the contents of directory4 are as shown in Table IV.

TABLE IV

| Name | inode number | link Id |
|------|--------------|---------|
| f    | 3            | 3       |

At this point, the lastLinkId field in inode 3 has value 3 because a total of three links to the file have been added since the file was created.

Next, flowcharts are presented to describe steps in routines of the present invention for assigning Link Ids and parent list entries to an inode after a link command is executed and for using Link Ids and parent list entries to resolve, or map, a pathname to a given file handle. In general, the flowcharts in this specification illustrate one or more software routines executing in a computer system such as computer system 14 of FIG. 2. The routines may be implemented by any means as is known in the art. For example, any number of computer programming languages such as "C", Pascal, FORTRAN, assembly-language, etc., may be used. Further, various programming approaches such as procedural, object oriented or artificial intelligence techniques may be employed.

The steps of the flowcharts may be implemented by one or more software routines, processes, subroutines, modules, etc. In some cases steps may be implemented by making use of operating system calls. It will be apparent that each flowchart is illustrative of merely the broad logical flow of the method of the present invention and that steps may be added to, or taken away from, the flowcharts without departing from the scope of the invention. Further, the order of execution of steps in the flowcharts may be changed without departing from the scope of the invention. Additional considerations in implementing the method described by the flowchart in software may dictate changes in the selection and order of steps. Some considerations are event handling by interrupt driven, polled, or other schemes. A multiprocessing or multitasking environment could allow steps to be executed "concurrently." For ease of discussion the implementation of each flowchart is referred to as if it is implemented in a single "routine".

Figure 3:
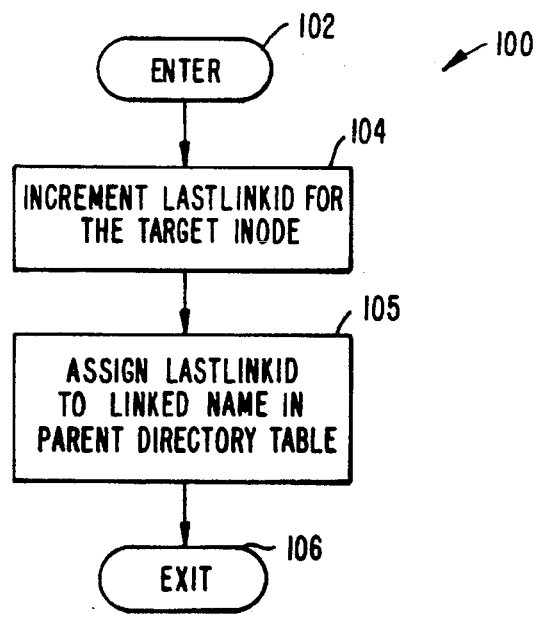
FIG. 3 shows a flowchart for a routine that is called when a link command to link a new name to a target inode is executed.

In FIG. 3, flowchart 100 is entered at step 102 when a link command to link a new name to a target inode, as described above, is executed. Before entering flowchart 100 it is assumed that the target inode has a lastLinkId field associated with it. The lastLinkId field is initially set to 1 for the original link to the target inode. The target inode has a Link Id of 1. The name used to create the target inode is associated with the Link Id and the target inode number as shown, for example, in Table I, above, for the link named "a." Each of the Tables represent information for inodes associated with the parent directory of the inodes residing in the parent directory.

At step 104 the lastLinkId value for the target inode is incremented to generate a Link Id for the new link. At step 105 the value of lastLinkId is assigned to the linked name in the parent directory table. In the present example, the target inode only has one link, named "a," and the lastLinkId value was left at 1. Thus, the incremented lastLinkId value is 2. A new entry is made in the parent directory table for the parent directory of the target inode, namely the root directory. The new entry includes the linked name, "b" along with the target inode number, 3, and the Link, Id 2. The routine of flowchart 100 exits at step 106.

Thus, the flowchart of FIG. 3 illustrates a method for assigning Link Ids when the link command is executed in an operating system.

Figure 4:
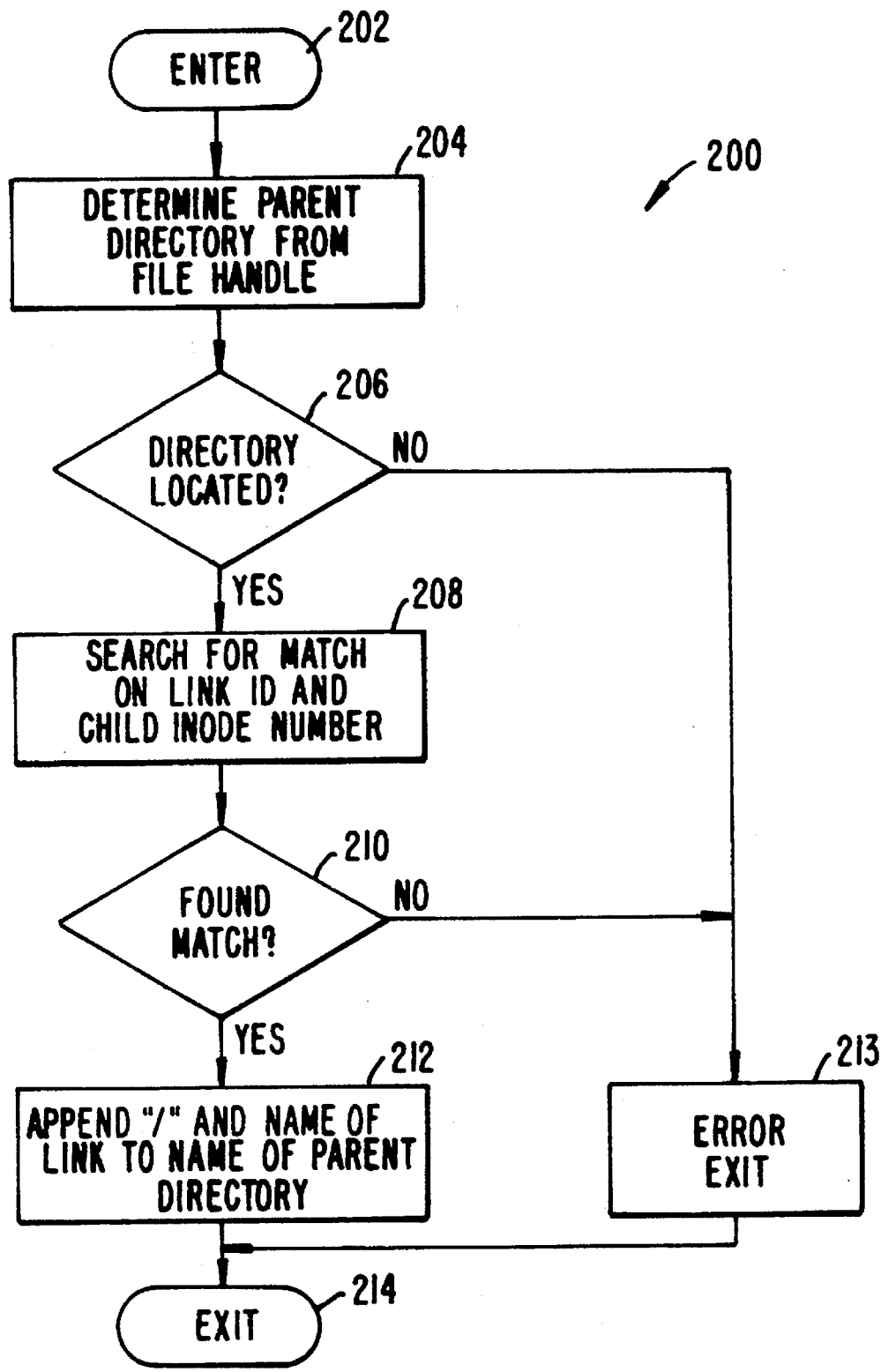
FIG. 4 shows a flowchart for a routine that uses the Link Ids and parent lists in a file system to associate a pathname to a file handle.

FIG. 4 shows flowchart 200 for a routine that uses Link Ids in a file system to associate a pathname to a file handle. Flowchart 200 is entered at step 202 where it is assumed that a file handle including a child inode number, a parent inode number, a file system number and a Link Id is passed.

At step 204, the parent inode number and file system number are used to locate the parent directory. At step 206, a test is made as to whether the directory was located or not. If the directory was not located, the file handle is assumed to be "stale" and the routine is exited with an error via step 213.

At step 208, the directory table is searched looking for a match on the child inode number and Link Id. At step 210, a test is made as to whether a match was found or not. If a match was not found, the file handle is assumed to be stale and the routine is exited with an error via step 213.

At step 212, the slash character ("/") and the file name in the directory entry matching the child inode and Link Id are appended to the name of the parent directory to form a complete pathname. The name of the parent directory is obtained using whatever function the operating system uses to obtain the directory name. In the preferred embodiment, a procedure that follows the steps used by the Unix operating system command "getcwd" is used to obtain the name of the parent directory.

Finally, the routine is exited at step 214.

Thus, FIG. 4 shows a routine for mapping a file handle to a pathname where the file handle is for a file that can have multiple pathnames.

In the foregoing specification, the invention has been described with reference to a specific exemplary embodiment thereof. It will, however, be evident that various modifications and changes may be made without departing from the broader spirit and scope of the invention as set forth in the appended claims. The specification and drawings are, accordingly, to be regarded in an illustrative rather than a restrictive sense, the invention being limited only by the provided claims.

What is claimed is:

1. A method for resolving pathnames to file handles in an operating system executing on a computer system, wherein the computer system includes a processor and a memory, wherein the operating system allows the creation of pathnames by accepting a sequence of ordered links to define a pathname, wherein each link includes a link name, wherein each link is associated between a parent file and a target file, wherein each file has a node number, wherein a given sequence of ordered links defines a pathname to the target file associated with the final link in the sequence, wherein the file handle for a given file includes the node number of the given file, the method comprising the steps of:

assigning a link ID number to a new file by performing the following substeps creating and storing a link to the new file from a pre-existing parent file;

creating and storing a node number for the new file;

storing a unique link ID number for the new file, wherein the link ID number is unique among all links to the target file; and subsequent to the above steps, recreating the pathname to the new file by using the node number and link ID of the new file.

2. The method of claim 1, wherein the operating system is an operating system having a UNIX® file and directory organization.

* * * * *